March 23, 1937.  W. NOBLE  2,074,967
HEAT EXCHANGE DEVICE
Filed June 15, 1934
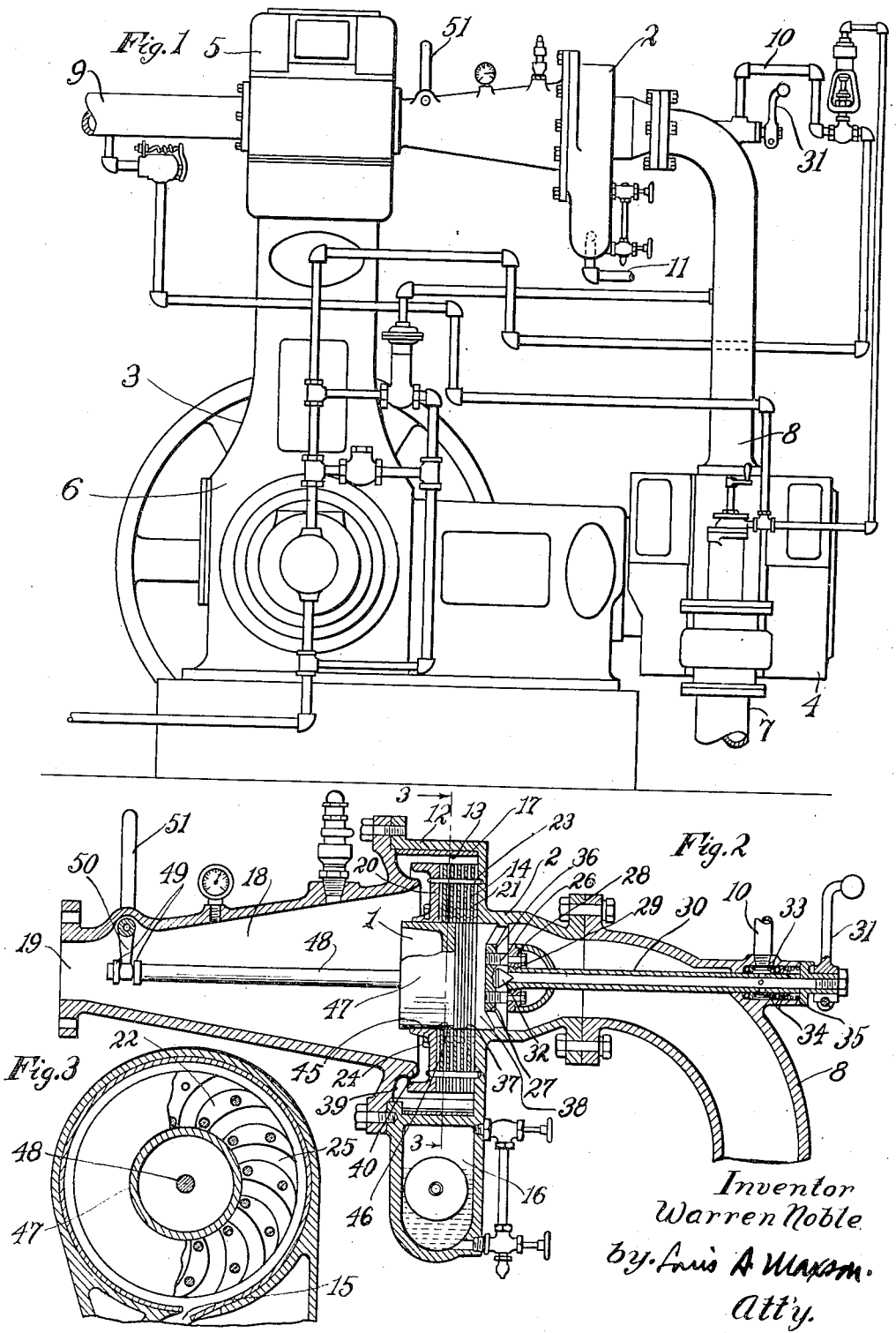
Inventor
Warren Noble
by Louis A Maxson
Att'y.

Patented Mar. 23, 1937

2,074,967

UNITED STATES PATENT OFFICE 2,074,967

HEAT EXCHANGE DEVICE

Warren Noble, Michigan City, Ind., assignor to Sullivan Machinery Company, a corporation of Massachusetts Application June 15, 1934, Serial No. 730,830

18 Claims. (Cl. 261—118)

This invention relates to heat exchange devices, and more particularly to improvements in the control means of heat exchange devices of the type wherein the fluid to be cooled is commingled with the cooling liquid and thereafter separated from the cooling liquid by separator means.

An object of this invention is to provide an improved heat exchange device having improved control means for regulating the flow of commingled fluid and cooling liquid therethrough. A further object is to provide an improved control valve means for a heat exchange device of the above character whereby the flow of the commingled fluid and cooling liquid through the separator means may be regulated to attain the most effective cooling and separating action of the fluid and liquid. Yet another object is to provide an improved valvular means for varying the flow of commingled fluid and cooling liquid through the separator means in accordance with the variations in pressure of the commingled fluid and liquid thereby to attain the maximum velocity of the fluid flow through the separator means, and as a result to attain the most effective separating action on the fluid. These and other objects will, however, subsequently more fully appear.

In the accompanying drawing there is shown for purposes of illustration one form which the invention may assume in practice.

In this drawing,—

Fig. 1 is a side elevational view of a fluid compressor system in which the illustrative form of the improved heat exchange device is embodied.

Fig. 2 is an enlarged central longitudinally extending vertical sectional view through the improved heat exchange device.

Fig. 3 is a cross sectional view partially broken away taken substantially on line 3—3 of Fig. 2.

In this illustrative embodiment of the invention the improved control means, generally designated 1, is associated with a heat exchange device 2 of a type similar to that disclosed in my copending application, Ser. No. 713,333, filed Feb. 28, 1934; the present invention forming an improvement over that disclosed in said application in that the flow of commingled fluid and cooling liquid through the separator means may be regulated to attain the most effective cooling and separating action. In the heat exchange device of the application referred to it has been found that when the rate of flow of the commingled fluid and cooling liquid through the separator is too low, the fluid and liquid are not effectively separated, and by the provision of the improved control means associated with the separator means it is possible to regulate the velocity of the fluid flow through the separator in accordance with the pressure of the fluid so that the most effective action of the separator means on the fluid is at all times possible. It is evident, moreover, that when a relatively small quantity of air is passed through a relatively large flow area, the intimate contact thereof with the cooling liquid is likely to be less effectively produced.

As disclosed in my copending application the heat exchange device with which the improved control means is associated is used in conjunction with a fluid compressor system comprising a fluid compressor, generally designated 3, of the well known angle-compound type comprising a low pressure cylinder 4 and a high pressure cylinder 5, the cylinders mounted upon a suitable frame 6 and each containing a usual piston actuated from the compressor crank shaft. The low pressure cylinder is provided with an intake pipe 7 and with a discharge pipe 8 connected to the intake of the improved heat exchange device 2, which is in this instance in the form of an intercooler. This intercooler is herein arranged in the space between the low and high pressure cylinders and the discharge connection of this intercooler is connected to the intake of the high pressure cylinder 5 and the compressed fluid is discharged from the latter cylinder through a discharge pipe 9. As the various control means for regulating the load on the compressor and for controlling the supply of cooling liquid to the intercooler are clearly described in the copending application above mentioned and do not in detail per se enter into this invention, further description thereof is considered unnecessary other than to state that a cooling liquid, herein water, under pressure is supplied to the intercooler through a pipe connection 10 and is discharged after use within the intercooler through a pipe line 11.

Now referring to the structure of the improved heat exchange device per se, it will be noted that the same comprises a casing 12 and this casing is secured to the discharge pipe 8 of the low pressure cylinder and to the intake of the high pressure cylinder. The intercooler casing has formed therein a circular chamber 13 in which a cooling and separating unit generally designated 14 is arranged and which discharges liquid through a bottom opening 15 to a cooling liquid discharge chamber 16, to the bottom of which the discharge pipe 11 is connected. The chamber 13 is lined with a non-corrosive liner 17, preferably of stainless steel, providing a water race with an extremely smooth inner surface, and one end of this liner is bent downwardly to form the discharge opening 15. The casing 12 has a fluid discharge passage 18 communicating with the intake of the high pressure cylinder of the compressor, and this discharge passage tapers inwardly from the cooling and separating unit chamber 13 and communicates with the high pressure cylinder intake through a relatively restricted passage 19, the compressed fluid, after separation from the cooling liquid within the chamber 13 discharging through the opening 19 to the high pressure cylinder intake, and the liquid separated from the compressed fluid draining into the chamber 16 from which it is discharged through the discharge pipe 11. The cooling and separating unit 14 is herein of built-up construction and comprises a separator plate 20 and a series of discs 21 spaced apart by a series of thin spirally arranged vanes 22, the component elements being positioned by pins 23 and held in place by screws 24. Between adjacent plates the space is broken up into a series of curved flow passages 25 having relatively large surface areas as compared with their flow areas and the curvature of these passages is formed to accelerate fluid flow therethrough. Through these passages the mingled air and water pass with a whirling motion which insures effective cooling and initiates an efficient separation on the centrifugal principle, a separation which is completed in the chamber surrounding the unit described. In this instance, secured by bolts 26 threadedly secured to a deflector or spray plate 27 supported within the casing 12 is a plate 28 having adjustably secured thereto as by threads 29 a cooling liquid supply pipe 30. This supply pipe has secured thereto at its outer extremity a handle 31 whereby the pipe may be rotated and thereby, due to its threaded connection with the plate 28 moved axially with respect to a controlling valve 32, which, when the parts are in the position shown in Fig. 2, maintains the inner end of the liquid supply pipe 30 closed. By moving the pipe 30 axially in and out with respect to the valve 32, the flow of cooling liquid through the pipe 30 may be manually regulated as desired. The cooling liquid supply pipe 10 communicates with the supply pipe 30 through a packing ring 33 and packing collars 34, 34 held in sealing engagement by a coil spring 35 so that a fluid tight seal is maintained between the pipe 10 and the pipe 30 irrespective of the adjusted position of the latter. The valve 32 is mounted on the liquid deflector or spray plate 27, and this plate is perforated by flow openings 37 so that the mingled air and water may flow therethrough into a central bore 38 formed in the casing 12. When the pipe 30 is moved axially to open the inner end thereof with respect to the valve 32, cooling liquid flows through the pipe 30 and as it is discharged from the latter it impinges against the plate 27 and is deflected laterally in the manner of a spray across the stream of compressed fluid flowing from the low pressure cylinder discharge pipe 8 of the compressor, the cooling liquid commingling with and traversed by the compressed fluid cooling the latter and condensing the water vapor therein, and the commingled liquid and compressed fluid forming a mixture flowing past the deflecting surfaces 36 and thence through the central bore 38 and thence through the arcuate or spiral passages 25 formed by the separator discs 21, causing the commingled liquid and compressed fluid to be whirled about the interior wall of the chamber 13, thereby effecting separation of the compressed fluid from the cooling liquid. The separated cooling liquid is drained into the liquid drain chamber 16, while the compressed fluid, then cooled, flows past a deflecting surface 39 formed on the inner wall of the casing and past an annular liquid retaining and flow forming lip 40 to the discharge opening 18, from which the cooled fluid is discharged through the opening 19 to the intake of the high pressure cylinder of the compressor.

Now referring to the illustrative form of the improved control means for regulating the flow of the previously commingled air and water through the separator means, it will be noted that formed in the separator plate 20 is a bore 45 alined with the bore 38 and of the same diameter; while formed by the inner peripheries of the discs 21 and plates 22 is an alined bore 46 of a similar diameter, and reciprocable in the bores 38, 45 and 46 is a piston valve 47. Suitably secured to the piston valve is an actuating rod 48 extending axially within the discharge passage 18 and having formed thereon at its outer end spaced collars 49 for engagement with a pivoted shipper yoke 50, the latter having a usual operating lever 51. It will be seen that when the piston valve 47 is moved axially within the bores 46 the flow of air and water through the curved passages 25 of the separator means may be regulated as desired. When the piston valve is in its innermost position against the plate 27 the flow of air and water through the separator means is entirely cut off, while when the piston valve is in its outermost position the passages 25 through the separator discs may be entirely open. Obviously suitable means would be used in practice either to preclude complete interruption of flow through the passages 25 or to interrupt water flow and effect unloading of the piston closed off passages 25 completely. The piston valve 47 may be manually adjusted to control the flow of air and water through the separator means in accordance with the pressure of the commingled fluids so that the desired velocity through the separator means may at all times be attained, and as a result the separator means will act with maximum efficiency. Although the piston valve 47 is shown to be manually controllable the same may, if desired, be controlled automatically by the pressure of the commingled fluids, or the pressure in chamber 18, space 8, or bore 38, or a plurality of them, so that the piston valve may be adjusted automatically in accordance with the pressure of the commingled fluids. For instance, the lever 51 may be connected to a pressure operating device in turn connected to the bore 38 so that when the pressure in the bore 38 becomes too low, the piston valve will automatically be moved to the right in Fig. 2 to reduce the flow area through the separator means, and as a result, increase the velocity of the fluid flowing through the separator means.

As a result of this invention, it will be noted that an improved heat exchange device is provided having improved and more efficient separator means for the commingled air and cooling water. It will further be noted that an improved separator means is provided whereby the flow of commingled air and cooling water through the separator means may be regulated in accordance with the pressure of the commingled fluids so that maximum efficiency of the separator means may at all times be attained. These and other uses and advantages of the improved heat exchange device will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a heat exchange device, a casing through which an at-least-partially-gaseous fluid to be cooled is adapted to flow, means for spraying cooling liquid into the fluid stream, means for separating the commingled gaseous fluid and liquid, and means for regulating the flow of commingled fluid and liquid to said separating means including means adjustable relative to the latter in a direction axially of said chamber to vary the flow area of said separating means while maintaining flow substantially in the same path conformation.

2. In a heat exchange device, a casing having a cylindrical chamber through which an at-least-partially-gaseous fluid to be cooled is adapted to flow, means for spraying cooling liquid into the fluid stream, stationary means discharging near the periphery of said chamber and having fluid inlet openings adjacent the center of said chamber for separating the commingled gaseous fluid and liquid by a whirling motion thereof about the interior of said cylindrical chamber, and means for regulating the flow of the pre-commingled fluid and liquid to said separating means while maintaining the nature of the flow substantially the same.

3. In a heat exchange device, a casing through which an at-least-partially-gaseous fluid to be cooled is adapted to flow, means for spraying a cooling liquid into the fluid stream, means for separating the commingled gaseous fluid and liquid comprising a centrifugal motion creating means providing a plurality of paths in parallel of similar conformation and length and having discharge openings in a common peripheral zone, whereby the commingled gaseous fluid and liquid is whirled about the interior of said casing to effect separation thereof, and means for regulating the flow of commingled fluid and liquid to said centrifugal motion creating means controlling the number of paths effective.

4. In a heat exchange device, a casing having a cylindrical chamber through which an at-least-partially-gaseous fluid to be cooled is adapted to flow, means for spraying a cooling liquid into the fluid stream, means forming spiral grooves in parallel transverse planes through which grooves the commingled gaseous fluid and liquid are adapted to flow, the spiral grooves discharging the gaseous fluid and liquid with a whirling motion about the interior of said cylindrical chamber to effect separation thereof, and means for regulating the flow of the pre-commingled fluid and liquid to said spiral grooves of said separating means.

5. In a heat exchange device, a casing having a cylindrical chamber through which an at-least-partially-gaseous fluid to be cooled is adapted to flow, means for spraying a cooling liquid into the fluid stream, means comprising a plurality of stationary substantially plane discs and vanes forming spiral grooves through which the commingled fluid and liquid are adapted to flow, the spiral grooves discharging the gaseous fluid and liquid with a whirling motion about the interior of said cylindrical chamber to effect separation thereof, and means for regulating the flow of the pre-commingled fluid and liquid to said spiral grooves of said separating means.

6. In a heat exchange device, a casing through which an at-least-partially-gaseous fluid to be cooled is adaped to flow, means forming a plurality of spiral flow passages of small flow area lying in planes transverse to the direction of flow into said casing, means for forming a water spray across the entrance of said casing, and valvular means within said casing and adjustable at right angles to said planes for controlling flow of the pre-commingled fluid and water through said spiral flow passages.

7. In a heat exchange device, a casing having a cylindrical chamber through which an at-least-partially-gaseous fluid to be cooled is adapted to flow, means for mixing a cooling liquid with the fluid to be cooled, means for separating the cooled gaseous fluid from the cooling liquid, and means bodily adjustable relative to said separating means for regulating the flow of the pre-mixed fluid and liquid to said separating means whereby the separating action thereon may be varied.

8. In a heat exchange device, a casing having a cylindrical chamber through which an at-least-partially-gaseous fluid to be cooled is adapted to flow, means for mixing a cooling liquid with the fluid to be cooled, stationary means for separating the cooling liquid from the cooled gaseous fluid by a centrifugal action including means providing a plurality of similar flow paths each discharging adjacent the inner wall of said chamber, and means for regulating the flow of the pre-mixed fluid and liquid to said separating means whereby the centrifugal action thereon may be varied while maintaining similar flow paths.

9. In a heat exchange device, a casing having a cylindrical chamber through which an at-least-partially-gaseous fluid to be cooled is adapted to flow, means for mixing a cooling liquid with the fluid to be cooled, means forming spiral grooves through which the mixture is adapted to flow with a whirling motion in radial planes about the interior of said cylindrical chamber to effect separation of the cooling liquid from the cooled fluid, and valvular means for regulating the flow of the previously-effected mixture through said spiral grooves whereby the separating action thereon may be varied.

10. In a heat exchange device, a casing through which an at-least-partially-gaseous fluid to be cooled is adapted to flow, means for spraying cooling liquid into the fluid stream, stationary means in said casing for separating the commingled gaseous fluid and liquid providing a plurality of similar flow paths, and means for regulating the flow of commingled fluid and liquid to said separating means effective to eliminate certain of said flow paths from operation while maintaining the general flow-path conformation substantially the same.

11. In a heat exchange device, a casing having a substantially cylindrical chamber provided with a tangential outlet, means in said chamber and spaced inwardly from the inner wall thereof for effecting flow in spiral paths in parallel planes extending transversely of the chamber axis, said means having adjacent the center thereof a substantially cylindrical recess with which the several flow paths communicate, means for creating a water screen transversely of the mouth of said recess, and means movable within said recess for occluding the inner termini of some of said paths.

12. In a heat exchange device, a casing having a substantially cylindrical chamber provided with a tangential outlet, means in said chamber and spaced inwardly from the inner wall thereof for effecting flow in spiral paths in parallel planes extending transversely of the chamber axis, said means having adjacent the center thereof a substantially cylindrical recess with which the several flow paths communicate, means for creating a water screen transversely of the mouth of said recess, and means movable within said recess and axially thereof for occluding the inner termini of some of said paths.

13. In a heat exchange device, a casing having a substantially cylindrical chamber provided with a tangential outlet, means in said chamber and spaced inwardly from the inner wall thereof for effecting flow in spiral paths in parallel planes extending transversely of the chamber axis, said means having adjacent the center thereof a substantially cylindrical recess with which the several flow paths communicate, means for creating a water screen transversely of the mouth of said recess, and means movable within said recess and axially thereof and towards said water screen for occluding the inner termini of some of said paths.

14. In a heat exchange device, a casing through which a fluid composed of mingled gas and vapor is adapted to flow, means for spraying cooling liquid into the fluid stream, means for separating the commingled gas and liquid including means for providing a plurality of similar series of flow paths, and means for varying at will the number of flow paths effective by varying the number of series in use.

15. In a heat exchange device, a casing through which a fluid composed of mingled gas and vapor is adapted to flow, means for spraying cooling liquid into the fluid stream, means for separating the commingled gas and liquid including means for providing a plurality of spiral flow paths opening outwardly from a common central zone, and means for varying at will the number of flow paths effective while maintaining an evenly-distributed flow outwardly about the periphery of said central zone.

16. In a heat exchange device, a casing through which a fluid composed of mingled gas and vapor is adapted to flow, means for spraying cooling liquid into the fluid stream, means for separating the commingled gas and liquid including means for providing a plurality of flow paths in parallel planes transverse to the axis of said casing, and means for varying at will the number of flow paths effective by eliminating from operation entirely the flow paths in certain of said transverse planes.

17. In a heat exchange device, a casing through which a fluid composed of mingled gas and vapor is adapted to flow, means for spraying cooling liquid into the fluid stream, means for separating the commingled gas and liquid including means for providing a plurality of spiral flow paths in parallel planes transverse to the axis of said casing, and means for varying at will the number of flow paths effective by introducing or cutting out entirely the flow paths in certain of said transverse planes.

18. In a heat exchange device, a casing through which an at-least-partially-gaseous fluid to be cooled is adapted to flow, means for spraying cooling liquid into the fluid stream, means providing a plurality of series of passages, with the corresponding passages in each series of similar conformation, for separating the commingled gaseous fluid and liquid, and means for cutting in or cutting out of operation at least one series of passages to vary the flow area of said separating means.

WARREN NOBLE.